US006930673B2

(12) United States Patent
Kaye et al.

(10) Patent No.: US 6,930,673 B2
(45) Date of Patent: Aug. 16, 2005

(54) COLLABORATIVE INPUT SYSTEM

(75) Inventors: Stephen T. Kaye, Clarksville, MD (US); David Eric Timmons, Clarksville, MD (US); Brad Eckert, Mesa, AZ (US); Dana Doubrava, Phoenix, AZ (US); Wesley Jacobs, Garland, TX (US)

(73) Assignee: GTCO CalComp, Columbia, MD (US)

( * ) Notice: Subject to any disclaimer, the term of this patent is extended or adjusted under 35 U.S.C. 154(b) by 158 days.

(21) Appl. No.: 09/986,623

(22) Filed: Nov. 9, 2001

(65) Prior Publication Data

US 2002/0056577 A1 May 16, 2002

Related U.S. Application Data

(60) Provisional application No. 60/246,978, filed on Nov. 13, 2000.

(51) Int. Cl.[7] .................................................. G09G 5/00
(52) U.S. Cl. ........................ 345/173; 345/179; 715/753; 348/14.08
(58) Field of Search ................................ 345/173–177, 345/179–181, 1.1, 2.1, 2.2, 2.3, 753–754; 715/753, 754; 178/18.01–18.07, 19.01–19.07; 348/14.08, 14.1, 14.09

(56) References Cited

U.S. PATENT DOCUMENTS

| | | | | |
|---|---|---|---|---|
| 4,400,724 A | * | 8/1983 | Fields ........................ 348/14.1 |
| 5,027,198 A | * | 6/1991 | Yoshioka .................. 348/14.08 |
| 5,049,862 A | * | 9/1991 | Dao et al. .................... 345/179 |
| 5,176,520 A | | 1/1993 | Hamilton | |
| 5,206,934 A | | 4/1993 | Naef, III | |
| 5,220,657 A | | 6/1993 | Bly et al. | |
| 5,401,916 A | * | 3/1995 | Crooks ..................... 178/18.03 |
| 5,434,372 A | * | 7/1995 | Lin .......................... 178/18.07 |
| 5,446,842 A | | 8/1995 | Schaeffer et al. | |
| 5,486,847 A | | 1/1996 | Ranf et al. | |
| 5,526,023 A | | 6/1996 | Sugimoto et al. | |
| 5,534,893 A | * | 7/1996 | Hansen et al. ............... 345/179 |
| 5,561,446 A | | 10/1996 | Montlick | |
| 5,581,702 A | | 12/1996 | McArdle et al. | |
| 5,594,470 A | | 1/1997 | Meyerson et al. | |
| 5,629,714 A | * | 5/1997 | Nishitani et al. ............. 345/2.3 |
| 5,768,492 A | | 6/1998 | Schumer | |
| 5,790,818 A | | 8/1998 | Martin | |
| 5,793,361 A | | 8/1998 | Kahn et al. | |
| 5,799,191 A | | 8/1998 | Moriyasu et al. | |

(Continued)

FOREIGN PATENT DOCUMENTS

DE 19535119 A1 3/1997
WO WO 00/42494 7/2000

*Primary Examiner*—Ricardo Osorio
(74) *Attorney, Agent, or Firm*—Manelli Denison & Selter; Edward Stemberger

(57) ABSTRACT

A collaborative input system 10 includes a host computer 12. A display 14 is associated with the host computer. The host computer includes a processor 15 configured for executing an application to provide an image 17 on the display 14. At least one electromagnetic digitizer 18 is provided separate from the host computer. The digitizer 18 has an input surface 22 defining a display space that is mapped to coincide with the display 14, and a pen structure 24 operatively associated with the input surface such that proximity of the pen structure with respect to the input surface, as a result of a user's input, is detected by the digitizer. A wireless communication link is provided between the host computer and the digitizer such that a user's input can be transmitted from the digitizer, be received by the host computer, and be represented graphically on the display together with the image in real time, thereby permitting the user, associated with the digitizer, to personally provide input to the host computer displaying the image.

24 Claims, 2 Drawing Sheets

U.S. PATENT DOCUMENTS

| | | | |
|---|---|---|---|
| 5,818,425 A | 10/1998 | Want et al. | |
| 5,818,616 A * | 10/1998 | Kawai | 398/72 |
| 5,838,914 A | 11/1998 | Carleton et al. | |
| 5,859,974 A | 1/1999 | McArdle et al. | |
| 5,872,924 A | 2/1999 | Nakayama et al. | |
| 5,889,946 A | 3/1999 | FitzPatrick et al. | |
| 5,897,648 A * | 4/1999 | Henderson | 715/530 |
| 5,920,694 A | 7/1999 | Carleton et al. | |
| 5,938,724 A | 8/1999 | Pommier et al. | |
| 5,966,512 A | 10/1999 | Bates et al. | |
| 5,974,558 A | 10/1999 | Cortopassi et al. | |
| 5,978,835 A | 11/1999 | Ludwig et al. | |
| 5,996,003 A | 11/1999 | Namikata et al. | |
| 6,008,804 A | 12/1999 | Pommier et al. | |
| 6,023,708 A | 2/2000 | Mendez et al. | |
| 6,047,314 A | 4/2000 | Pommier et al. | |
| 6,061,717 A | 5/2000 | Carleton et al. | |
| 6,073,161 A | 6/2000 | DeBoskey et al. | |
| 6,078,947 A | 6/2000 | Kagermeier | |
| 6,092,117 A | 7/2000 | Gladwin et al. | |
| 6,105,055 A | 8/2000 | Pizano et al. | |
| 6,108,687 A | 8/2000 | Craig | |
| 6,119,147 A | 9/2000 | Toomey et al. | |
| 6,141,000 A | 10/2000 | Martin | |
| 6,262,719 B1 * | 7/2001 | Bi et al. | 345/179 |
| 6,320,597 B1 * | 11/2001 | Ieperen | 345/629 |

* cited by examiner

COLLABORATIVE INPUT SYSTEM

This application is based on U.S. Provisional Application No. 60/246,978 filed on Nov. 13, 2000 and claims the benefit thereof for priority purposes.

FIELD OF THE INVENTION

The invention relates to digitizers or graphics tablets having wireless interfaces to allow one or more units to share bandwidth in the same physical environment so that more than one unit can communicate with and control a host computer.

BACKGROUND OF THE INVENTION

More and more work in organizations is being conducted through teams or groups. It is common to conduct group meetings wherein a host computer operating application software is used to deliver and display meeting content so that everyone in that meeting can conveniently view the content. The visual images created by the applications provide meeting participants with the opportunity to collaborate with their colleagues more effectively. The difficulty, however, is that in these meetings, it is not easy to convey and disseminate information effectively, especially when multiple applications are utilized in the meeting such as presentation software and Computer Aided Design (CAD) software. Even with such powerful software, meeting participants are left to their own techniques to capture meeting notes and information, typically through their own note taking. In addition, the host typically will have the same issue and be forced to keep track of the meeting progress through his or her own note taking, often generated after the meeting. The result is that meeting participants are often not on the same page with regard to events at the meeting.

Furthermore, individuals in a group meeting are not typically able to directly control the host computer or annotate and edit the display content. The result is that only one participant at a time, usually the meeting's host, owns the means to control, via a keyboard or other input device, the flow of information from participants to the host computer where the information is displayed and saved and then later distributed. All other participants are dependent on the host to acknowledge, properly interpret, accept and then accurately input their ideas into the host computer for others to view.

Accordingly, there is a need to provide a collaborative input system which enables every participant to personally control and provide input to the host computer through the use of multiple wireless pen-based devices and which captures the currently displayed image, no matter what application generated the image, thereby permitting a user to annotate directly over the image and thus capture specific notes associated with that image.

SUMMARY OF THE INVENTION

An object of the invention is to fulfill the need referred to above. In accordance with the principles of the present invention, this objective is achieved by providing a collaborative input system that includes a host computer and a display associated with the host computer. The host computer is configured to execute an application to provide an image on the display. At least one electromagnetic digitizer is provided separate from the host computer. The digitizer has an input surface defining a display space that is mapped to coincide with the display, and a pen structure operatively associated with the input surface such that proximity of the pen structure with respect to the input surface, as a result of a user's input, is detected by the digitizer. A wireless communication link is provided between the host computer and the digitizer such that a user's input can be transmitted from the digitizers, be received by the host computer, and be represented graphically on the display together with the image in real time, thereby permitting the user associated with the digitizer to personally provide input to the host computer displaying the image.

In accordance with another aspect of the invention, a method of providing input to a host computer is provided. The host computer has a display associated therewith and includes a processor configured for executing an application to provide an image on the display. The method includes providing one or more electromagnetic digitizers separate from the host computer and separate from each other. Each digitizer has an input surface defined to a display space, and a pen structure operatively associated with the input surface such that proximity of the pen structure with respect to the input surface, as a result of a user's input, is detected by the digitizer. The display space is mapped to coincide with the display. A wireless communication link is provided between the host computer and each digitizer such that a user's input can be transmitted from any of the digitizers, be received by the host computer, and be represented graphically on the display together with the image in real time, thereby permitting multiple users, each associated with a digitizer, to personally provide input to the host computer displaying the image.

In accordance with yet another aspect of the invention, a method of capturing presentation information at a host computer is provided. The host computer has a display associated therewith and includes a processor configured for executing an application to provide an image on the display. The method includes capturing a current image on the display, making the captured image a background image, capturing annotation associated with the background image made remotely from the host computer via an electromagnetic digitizer, the digitizer having an input surface defining a display space that is mapped to coincide with the display, and saving the background image and annotation.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE PREFERRED EMBODIMENT

Figure 1:
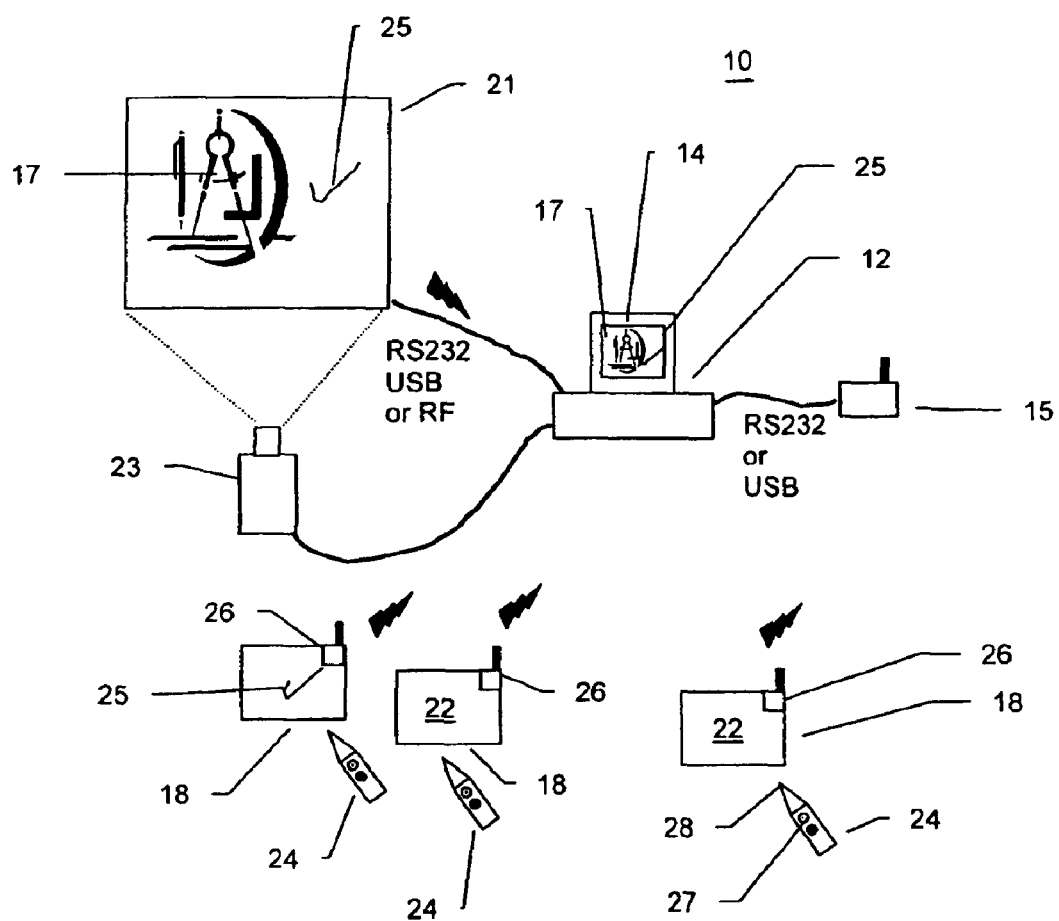
FIG. 1 is a schematic view of a collaborative input system provided in accordance with the principles of the invention.

With reference to FIG. 1, a collaborative input system, generally indicated at 10, is shown in accordance with the principles of the present invention. The system 10 includes a host computer 12 having a display 14 associated therewith. The host computer 12 includes a processor configured for executing an application such as, for example, CAD software or presentation software, to provide an image 17 on the display 14. The display 14 is preferably projected, by means of a projector 23 onto a digital whiteboard 21 such as, for example, the Interwrite MeetingBoard™ manufactured by GTCO CalComp. Thus, the host can provide input to the image 17 via a pen device operatively associated with the whiteboard. The display 14 can also be a host computer monitor. A radio frequency transceiver 15 is associated with the host computer 12 to transmit and receive radio frequency communication from one or more electromagnetic digitizers, generally indicated at 18, as will be explained more fully below.

The electromagnetic digitizers 18 are separate from the host computer 12 and separate from each other. All digitizers 18 are located in a common area within radio frequency communication with the host computer transceiver 15. Each electromagnetic digitizer 18 is a pen-based unit such as, for example, the Interwrite MeetingPad™ manufactured by GTCO CalComp. As used herein, the term "digitizer" includes devices such as graphic tablets having an opaque writing or input surface 22. There is no local user display feature or storage at the digitizers 18. The digitizers 18 are of the conventional electromagnetic coupling type in which exciting lines and detecting lines are arranged in X and Y directions, respectively. The digitizer 18 detects changes in the signal levels of the detecting lines due to a magnetic field of a pen structure 24 to thereby detect position of a pen structure 24, when the pen structure is in proximity to the input surface. The pen structure 24 is preferably a wireless pen that communicates with the digitizer 18 via an electromagnetic wave that is received by a detection circuit of the digitizer in the conventional manner. Due to proximity sensing, the pen structure 24 need not contact the input surface 22. The pen structure 24 includes side buttons 27 and a tip button 28 to provide the functions of left and right mouse buttons so that the digitizer user can control mouse functions of the host computer 12. Depressing the buttons 27 or 28 causes a radio frequency signal to be sent from the digitizer 18 and received by the host computer to control mouse functions of the host computer 12 or to perform annotation on the captured screen surface as will be explained below.

Each digitizer 18 is preferably wireless and includes a radio frequency transceiver 26 for transmitting data to the host computer 12 via the transceiver 15. Thus, the system 10 includes a radio frequency communication link between each digitizer 18 and the host computer 12 via the transceiver 15.

An addressing scheme allows multiple digitizers 18 to share bandwidth within the same physical environment so that more than one digitizer 18 can communicate and control the host commuter 12 while the digitizer 18 is operating in an untethered mode. In particular, an RF device (transceiver 15) is coupled to the host computer 12 via serial or USB cable. In the broadest aspects of the invention, the transceiver 15 may be considered to be part of the host computer 12, but is preferably a separate device. The transceiver 15 only asks for data when no other digitizer 18 is transmitting. Each digitizer 18 only talks (transmits) when asked for data by the transceiver 15. The exception is when another digitizer 18 has not answered at its full address, there is a small window where a digitizer 18 can send a link request to the transceiver 15 at the same primary address.

Addressing works as follows. The manager has a primary address (for example, 0 to 9. Each digitizer 18 has a sub address added to the primary address (for example 0 to F). A digitizer 18 only sends data when it sees (receives) its full address sent by the transceiver 15. The transceiver 15 only talks to digitizers with the same primary address. In the embodiment, the display 14 primary address is set by a switch and the sub address thereof is a fixed number.

The sub address for the digitizers 18 are preferably set by the host, allowing more dynamic configuration to occur. The configuration process is as follows:

1) The user presses a Link button on the digitizer 18.
2) The digitizer 18 looks for the next valid packet from the transceiver 15.
3) The digitizer 18 then uses that address for the primary part of its address and sets its sub address to 0.
4) The digitizer 18 transmits a link request packet to the transceiver 15. This is done when any device (e.g. digitizer) with the same primary address is addressed but does not have any data to send. After a short delay during which the other device should have sent its data, the digitizer 18 sends a short link request packet to the transceiver 15. The transceiver 15 then sends commands to the digitizer 18 to change its sub address (4 to F) and then asks the digitizer 18 for information about itself and for data. Multiple transceivers 15 can work together because they can check to make sure no one else is talking when they want to talk.

With the system 10, a meeting can be made more productive when all participants have a convenient and natural way to take control of the host computer 12 and individually provide their ideas and inputs.

A single, predefined coordinate system is used in the system 10 that resides on the host computer 12. All digitizers 18 are mapped in the same graphic display space that coincides with the display 14. For example, as shown in FIG. 1, information 25 input on digitizer 18' coincides with the display 14 so as to be shown in the corresponding location on the display 14 and on the projected image on the whiteboard 21. Handwritten information 25 does not appear on the digitizer 18, the stoke is however captured electronically and is represented graphically on the display 14 and whiteboard 21 (if provided) together with the image 17. The screen capture and annotation is done by a software application such as the Interwrite™ software of GTCO CalComp. The software runs on the host computer 12 which has the drivers included for hardware to map the digitizer display space to the display 14. The software has two basic elements: 1) the application that allows the images to be captured, annotated and saved and 2) the interface to the hardware, that interprets the information coming in from the digitizers 18.

Figure 2:
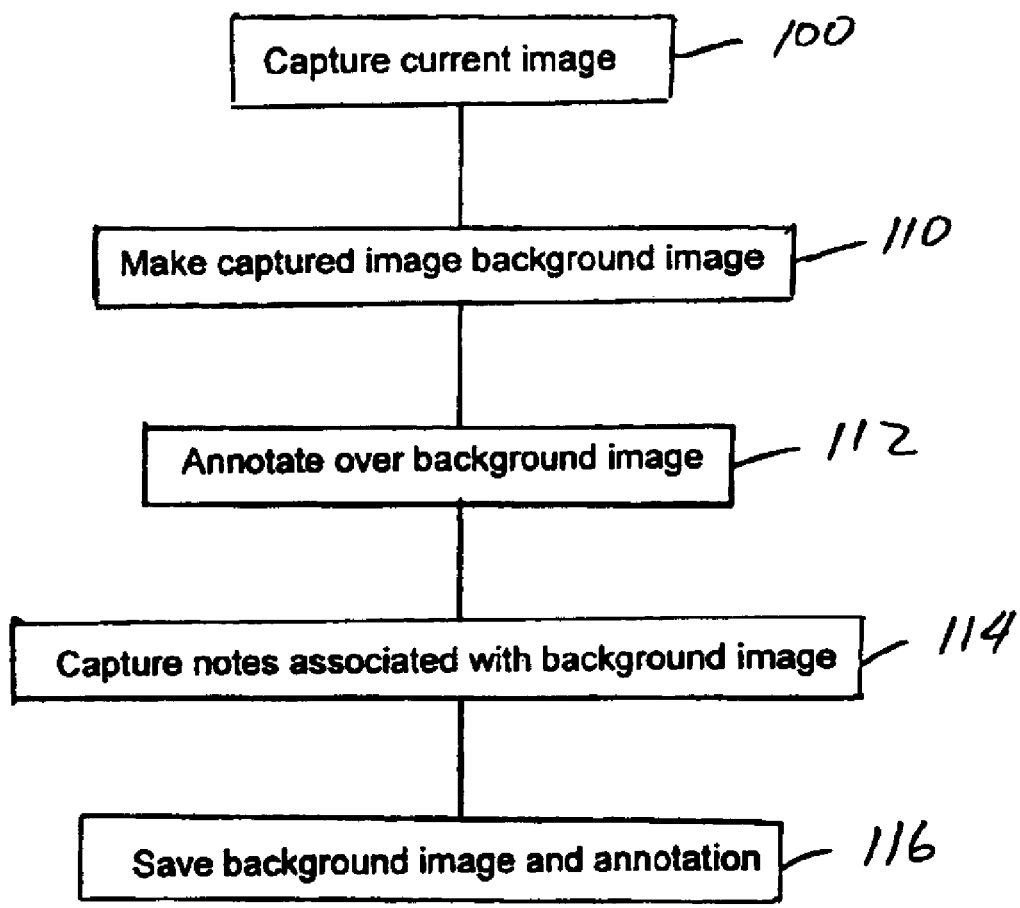
FIG. 2 is a flow chart of a process of capturing image and annotation information in accordance with the invention.

The host computer 12 includes a processor for executing an application such as the Interwrite™ software to capture the currently displayed image, no matter what application generated this image. FIG. 2 shows the steps of capturing an image and capturing specific notes associated with the image. The steps of FIG. 2 can be implemented as executable code stored on computer readable medium (e.g., a hard disk drive, a floppy drive, a random access memory, a read only memory, an EPROM, a compact disc, etc.).

With reference to FIG. 2, in step 100, an image 17 currently displayed on display 14 is captured. In step 110, the captured image becomes a background image allowing a user to annotate directly over the background image 17 (step 112). In step 114, the specific notes associated with the background image are captured. Thereafter in step 116, the background image and annotation are saved to file for storage and distribution. Multiple images are saved using a file format that compresses the master image, adds header information identifying the location of the images associated with the meeting, which includes the actual images and notes written. This file, containing multiple images, can then be distributed to all meeting participants. To support meeting participants that do not have the application on their personal computer, a self-executing file structure is supported, which bundles a viewer program with the image file to allow viewing and printing of the images without need for any additional software. This alleviates attendees from being required to have their own individual sets of notes and allows all meeting participants, and even non-participants, to view actual notes and images from the meeting, allowing all to be "on the same page".

It can be appreciated that the system 10 can be employed without annotating over an image presented on the display 14 via software operating on the host computer 12. For example, meeting participants can initiate the meeting by inputting information on a digitizer 18, with the information being represented graphically on the display 14.

Thus, the collaborative input system 10 allows meeting participants to manipulate, then annotate, over 2D or 3D models generated from any Computer Aided Design (CAD) application, or images from presentation software, running concurrently. A sequence of images generated at a meeting can be created, saved, viewed, printed and subsequently e-mailed. Since the images can optionally be saved in a self-executing file, meeting participants, suppliers and other outside business partners can now all be on the same page, even if they don't have the system 10.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A collaborative input system comprising:
   a host computer,
   a display associated with the host computer, the host computer being constructed and arranged to execute an application to provide an image on the display,
   a plurality of electromagnetic digitizers provided separate from the host computer, each digitizer having an input surface defining a space that is mapped to coincide with the display via computer readable medium, at the host computer, having stored thereon sequences of instructions for mapping the space to the display, each digitizer being constructed and arranged to have no display features, each digitizer having a pen structure operatively associated with the input surface such that proximity of the pen structure with respect to the input surface, as a result of a user's input, is detected by the digitizer,
   a wireless communication link between a single transceiver associated with the host computer and the plurality of the digitizers such that a user's input can be transmitted from one of the digitizers, be received by the host computer, and be represented graphically on the display together with the image in real time, thereby permitting a user associated with the one digitizer to personally provide input to the host computer displaying the image, and
   computer readable medium, at the host computer, having stored thereon sequences of instructions for prioritizing and managing data from each of the plurality of digitizers.

2. The input system of claim 1, wherein the plurality of electromagnetic digitizers are provided separate from each other and each digitizer is un-tethered.

3. The input system of claim 2, wherein the communication link includes a radio frequency transceiver at each digitizer and the single transceiver is a single radio frequency transceiver associated with the host computer, and wherein the computer readable medium for prioritizing and managing ensures that the single transceiver communicates with a digitizer when no other digitizer is communicating with the single transceiver.

4. The input system of claim 1, further comprising a digital whiteboard upon which the display is projected.

5. The input system of claim 4, wherein the digital whiteboard communicates wirelessly with the host computer.

6. The input system of claim 1, wherein the pen structure is constructed and arranged to communicate with the input surface in a cordless manner.

7. The input system of claim 1, wherein the pen structure is constructed and arranged to control mouse functions of the host computer via computer readable medium residing at the host computer.

8. The input system of claim 1, wherein the input surface is an opaque writing surface.

9. A collaborative input system comprising:
   a host computer,
   means for displaying an image, associated with the host computer, the host computer being constructed and arranged to execute an application to provide an image on the displaying means,
   a plurality of un-tethered electromagnetic digitizing means for inputting data, each digitizing means being separate from the host computer, each digitizing means having an input surface defining a space that is mapped to coincide with the displaying means via computer readable medium, at the host computer, having stored thereon sequences of instructions for mapping the space to the displaying means, each digitizing means being constructed and arranged to have no display features, each digitizing means having a pen structure operatively associated with the input surface such that proximity of the pen structure with respect to the input surface, as a result of a user's input, is detected by the digitizing means, and
   means for communicating between the host computer and each of the digitizing means, the means for communicating including a single transceiver associated with the host computer such that a user's input can be transmitted from one of the digitizing means, be received by the transceiver associated with the host computer, and be represented graphically on the displaying means together with the image in real time, thereby permitting a users associated with the one a digitizing means to personally provide input to the host computer displaying the image, each digitizing means being constructed and arranged to communicate with the single transceiver when data is requested by the single transceiver and the single transceiver requests data from a digitizing means when no other digitizing means is communicating with the single transceiver.

10. The input system of claim 9, wherein the means for communicating includes a radio frequency transceiver at each digitizing means and the single transceiver is a single radio frequency transceiver associated with the host computer.

11. The input system of claim 9, further comprising a digital whiteboard upon which the display is projected.

12. The input system of claim 11, wherein the digital whiteboard communicates wirelessly with the host computer.

13. The input system of claim 9, wherein the pen structure is constructed and arranged to communicate with the input surface in a cordless manner.

14. The input system of claim 9, wherein the pen structure is constructed and arranged to control mouse functions of the host computer.

15. The input system of claim 9, wherein the input surface is an opaque writing surface.

16. A collaborative input system comprising:
host computer,
a display associated with the host computer,
a plurality of un-tethered electromagnetic digitizers provided separate from the host computer, each digitizer having an input surface defining a space that is mapped to coincide with the display via computer readable medium, at the host computer, having stored thereon sequences of instructions for mapping the space to the display, each digitizer being constructed and arranged to have no display features, each digitizer having a pen structure operatively associated with the input surface such that proximity of the pen structure with respect to the input surface, as a result of a user's input, is detected by the digitizer, and
a wireless communication link between a single transceiver associated with the host computer and the plurality of digitizers such that a user's input can be transmitted from one of the digitizers, be received by the host computer, and be represented graphically on the display in real time, wherein a digitizer communicates with the single transceiver when requested to do so by the single transceiver, and the single transceiver communicates with a digitizer when no other digitizer is communicating with the single transceiver.

17. The input system of claim 16, wherein the plurality of electromagnetic digitizers are provided separate from each other.

18. The input system of claim 17, wherein the communication link includes a radio frequency transceiver at each digitizer and the single transceiver is a single radio frequency transceiver associated with the host computer.

19. The input system of claim 16, further comprising a digital whiteboard upon which the display is projected.

20. The input system of claim 19, wherein the digital whiteboard communicates wirelessly with the host computer.

21. The input system of claim 16, wherein the pen structure is constructed and arranged to communicate with the input surface in a cordless manner.

22. The input system of claim 16, wherein the pen structure is constructed and arranged to control mouse functions of the host computer.

23. The input system of claim 16, wherein the input surface is an opaque writing surface.

24. A method of providing input to a host computer having a display associated therewith, the host computer being configured to execute an application to provide an image on the display, the method including:
providing a plurality of un-tethered electromagnetic digitizer separate from the host computer, each digitizer having an input surface defining a space, each digitizer being constructed and arranged to have no display features, each digitizer having a pen structure operatively associated with the input surface such that proximity of the pen structure with respect to the input surface, as a result of a user's input, is detected by the digitizer,
mapping the space to coincide with the display via computer readable medium, at the host computer, having stored thereon sequences of instructions for mapping the space to the display,
providing a wireless communication link between a single transceiver associated with the host computer and the plurality of digitizers such that a user's input can be transmitted from one of the digitizers, be received by the host computer, and be represented graphically on the display together with the image in real time, thereby permitting the users associated with the digitizer to personally provide input to the host computer displaying the image, and
prioritizing and managing data from each of the plurality of digitizers at the host computer.

* * * * *